W. NELSON.
MACHINE FOR MAKING THE SOCKET MEMBERS OF SNAP BUTTONS.
APPLICATION FILED OCT. 7, 1916.

1,432,083.

Patented Oct. 17, 1922.
14 SHEETS—SHEET 1.

Fig. 1.

Inventor
William Nelson
By his Attorneys,

W. NELSON.
MACHINE FOR MAKING THE SOCKET MEMBERS OF SNAP BUTTONS.
APPLICATION FILED OCT. 7, 1916.

1,432,083.

Patented Oct. 17, 1922.
14 SHEETS—SHEET 2.

Fig. 2.

Inventor
William Nelson
By his Attorneys,

W. NELSON.
MACHINE FOR MAKING THE SOCKET MEMBERS OF SNAP BUTTONS.
APPLICATION FILED OCT. 7, 1916.

1,432,083.

Patented Oct. 17, 1922.
14 SHEETS—SHEET 5.

Inventor
William Nelson
By his Attorneys,

W. NELSON.
MACHINE FOR MAKING THE SOCKET MEMBERS OF SNAP BUTTONS.
APPLICATION FILED OCT. 7, 1916.

1,432,083.

Patented Oct. 17, 1922.
14 SHEETS—SHEET 8.

Inventor
William Nelson
By his Attorneys,

Inventor
William Nelson
By his Attorneys, Baldwin Wight

Patented Oct. 17, 1922.

1,432,083

UNITED STATES PATENT OFFICE.

WILLIAM NELSON, OF NEW YORK, N. Y., ASSIGNOR, BY MESNE ASSIGNMENTS, TO CONSOLIDATED AMERICAN FASTENER COMPANIES, INC., OF NEW YORK, N. Y., A CORPORATION OF NEW YORK.

MACHINE FOR MAKING THE SOCKET MEMBERS OF SNAP BUTTONS.

Application filed October 7, 1916. Serial No. 124,366.

*To all whom it may concern:*

Be it known that I, WILLIAM NELSON, a citizen of the United States, residing in New York, county and State of New York, have invented certain new and useful Improvements in Machines for Making the Socket Members of Snap Buttons, of which the following is a specification.

This invention relates to the manufacture of one of the parts of the well known snap fastener or press button, which consists of two members, namely, a stud and a socket. The invention is directed to the provision of an improved form of mechanism for making socket members for such snap fasteners. More specifically the invention relates to a machine for making socket members for snap fasteners of the type disclosed in an application for patent filed by myself and William C. Huguley on September 22, 1916, and serially numbered 121,647.

The socket member consists of a concavo-convex body portion having a peripheral edge which is turned inwards and a central hollow portion properly shaped to form a socket for the stud. A spring mounted within the body portion is held by the turned edge thereof and has two parallel arms extending through slots in the central part of the socket which are held in such position as to engage the studs when the latter enters the socket. This general form of press button or snap fastener is now well known and very extensively used.

The new machine constructed in accordance with my invention produces the concavo-convex body portion of the fastener by mechanism substantially the same as that shown in the application for patent filed by myself and William C. Huguley, above mentioned, but the mechanism for forming the wire springs and for inserting them in the sockets is entirely different.

Briefly stated the machine comprises mechanism which is adapted to first progressively form a hollow projection on the stock which is subsequently slotted to receive the arms of the spring catch, and after this, that part of the stock between the projections is punched out in order to facilitate the subsequent drawing operations. The stock is then bent to form a depression in the metal for the body portion of the socket which is next pierced to provide thread holes and is then shaped and has the initials of the manufacturer applied. After this the previously formed spring is inserted and finally the socket member is cut or blanked out from the stock and the peripheral edge is turned over the outer part or body of the spring.

The springs are formed from wire of indefinite length which is fed through straightening rolls to wire-bending devices which give shape to the spring, and novel mechanism is employed for feeding the springs to a suitable spring holder from which they are delivered one by one to the socket member of the fastener and made to engage therewith. These operations are so performed and so timed that a single socket with an inserted spring is completed by a single revolution of the actuating shaft, the different operations being simultaneously performed on different parts of the stock which is fed forward step-by-step so that the socket may be gradually produced without defects and without undue strain on the stock or the metal forming the socket member of the fastener.

In the accompanying drawings.

Figures 16 to 27 inclusive are views of the mechanism for cutting and bending the wire to form the spring catches, the different positions of the mechanism being illustrated in the various figures.

Fig. 32 is a vertical fragmentary section taken through the arbor and illustrating the manner of connecting the slide with the arbor.

The main frame of the machine may be of any suitable kind. It comprises a lower part Z and an upper part Z'. $Z^2$ indicates mechanism for raising and lowering the upper dies.

Figure 1:
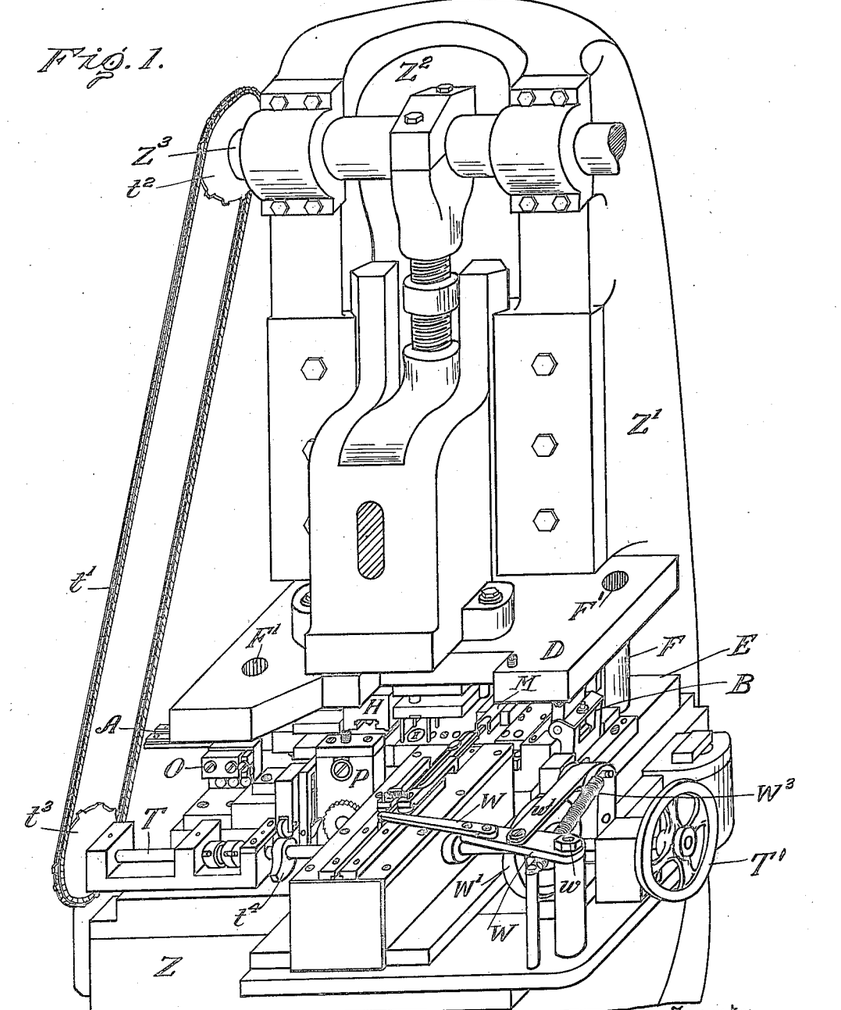
Figure 1 is a perspective view of a machine embodying my invention.

The end if the machine where the stock enters is the left-hand end. Figure 1 is a perspective view looking mainly at the front of the machine.

Two sets of mechanisms are employed, one for forming the buttons and the other for forming the springs. The button forming mechanism is at the rear of the machine and the spring forming mechanism at the front thereof.

The stock in the form of a metal strip or ribbon X is passed through the guide A and between the upper and lower dies and punches to a stock feeder B which is operated to pull the stock through the machine between the dies.

The upper dies are supported by an upper die carrier D and the lower dies are fixed to the bed plate E. The upper die carrier is formed with sockets or hollow bosses F', through which extend posts F rising from the bed plate E. These posts serve to guide the die carrier while being raised and lowered.

From the guide A the stock passes to a device C which progressively notches or cuts out from the metal a small part of the edge portion of the strip to form a shoulder which engages a part of the device and limits the forward movement of the stock while being fed.

The stock is next operated upon by upper and lower dies G, G' to draw the metal in such manner as to gradually form a projection on the stock which is subsequently shaped to form the socket part of the button.

After the projection is made on the stock the next step in the process is to cut slots in the projection for receiving the parallel arms of the spring catch. This is done by the mechanism indicated at H, H'.

All of the mechanism just described and some of the mechanism subsequently described is substantially the same as that shown in the Huguley and Nelson application above referred to and is therefore only referred to in a general way.

The next operation is to cut out the metal between the projections of the stock in order to relieve it of strain and to facilitate the drawing operations. This is done by the dies I, I'.

The stud-receiving socket part of the button is now complete. After this the stock is depressed to form the body portion of the button. This is accomplished by the next set of dies J, J'.

The parts marked $x$ in the drawings are merely depressions in the dies to prevent the projections on the stock from being crushed when the stock is fed without advancing the projections from one set of dies to another.

In order to form thread holes in the body of the button metal piercing dies are employed. These consist of two members K and K' constructed and operated in the manner described in the Huguley and Nelson application. After the thread holes are formed the metal is operated upon by dies L, L' which give a concavo-convex shape to the depressed portion. The dies may be and preferably are so formed that they will emboss the convex side of the depression and will also apply the initials of the manufacturer thereto.

The button is now ready to receive the spring catch, the process of the construction of which will be hereinafter described. For the present it may be stated that as fast as the springs are formed they are delivered to a spring holder M and are transferred therefrom to the buttons.

After the springs are inserted the button is cut from the stock and is delivered from the machine while the stock passes through a guide N to the stock feeding mechanism B which is operated to advance the stock step by step between the dies.

The stock feeding mechanism comprises a lower lever $b$ pivoted at $b'$ to a block $e$ on the bed plate E and is formed with a bifurcated laterally projecting arm $b^2$ having a jaw $b^3$ which cooperates with a jaw $b^4$ on the upper lever B' which is pivoted at $b^5$ to the lever $b$. The lever B' carries a roller $b^6$ operating in a slot $b^7$ in a cam plate $B^2$ attached to the upper die carrier. A set screw $B^3$ carried by a bar $B^4$ is employed for adjusting and regulating the feed. $B^5$ indicates spring brakes for restraining the movement of the lever $b$, thus insuring the proper movement of the lever B'.

Before describing how the spring catches are inserted in the button the manner in which these catches are produced will be explained.

The wire $z$ for the springs is fed to rollers O, O' which remove all kinks and bends in the wire. From the straightening rolls the wire passes to the wire feeding devices P which are operated to feed the wire step by step to the mechanism which cuts it into suitable lengths and bends the cut off portions into springs. The straightening devices and the wire feeding devices are similar to those shown in the application of Huguley and Nelson before referred to.

Figure 12:
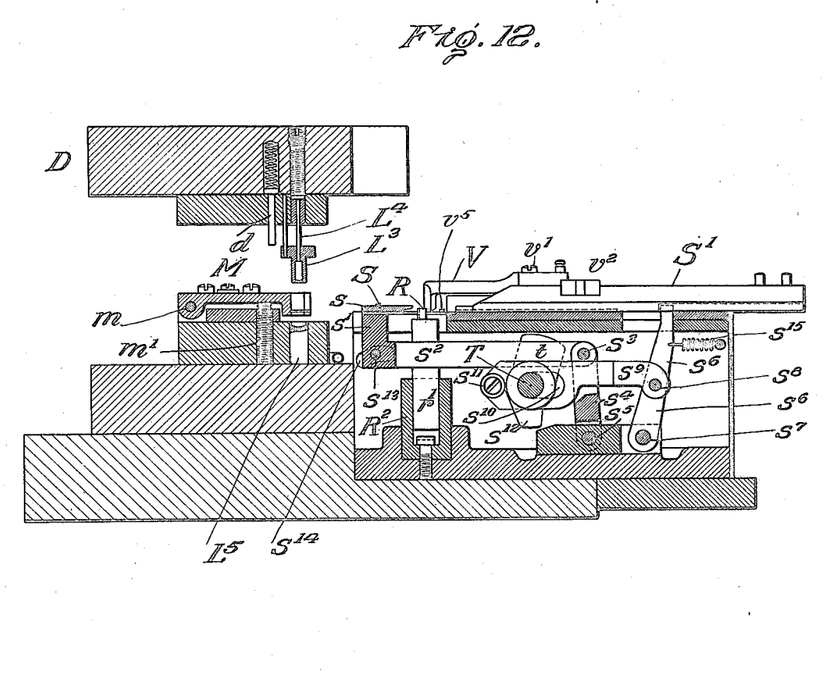
Figure 12 shows a vertical section of the wire bending devices and the punches which insert the wire springs in the sockets.
Figures 13, 14:
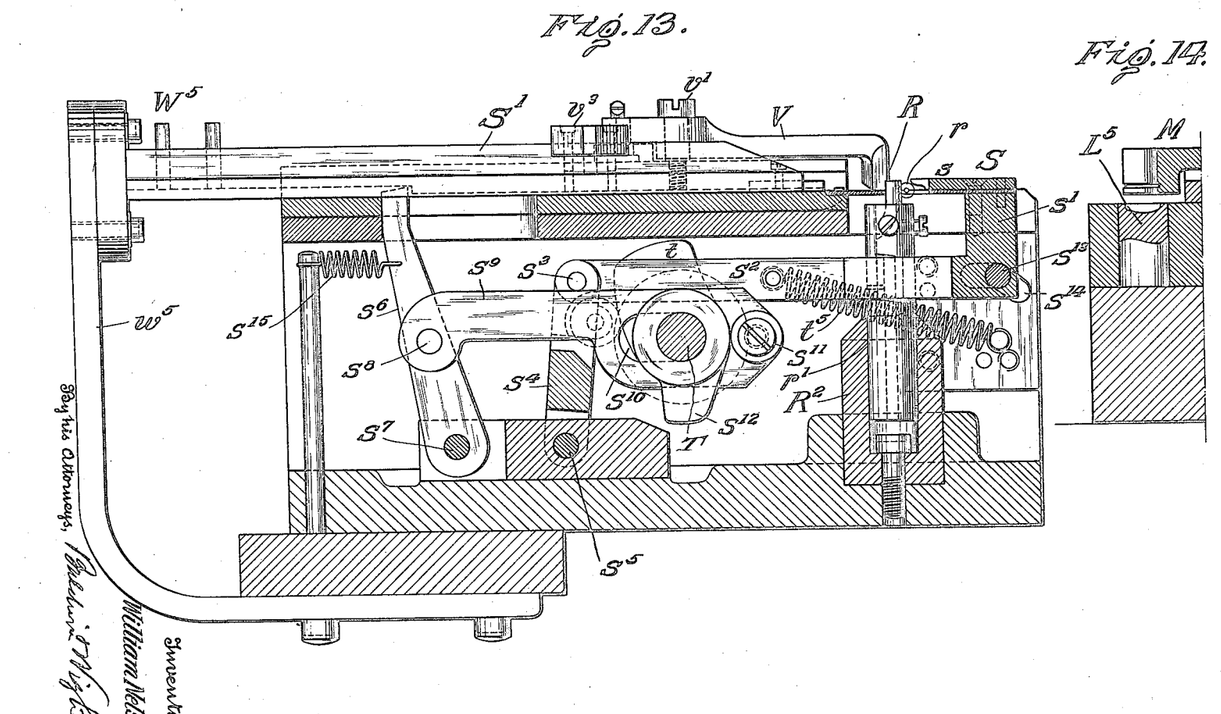
Figure 13 shows a transverse section of the wire-bending devices.
Figure 14 is a detail sectional view of the spring holder and an anvil arranged below it.

The wire passes from the feeding mechanism through a pipe guide $r$ over a mandrel or arbor R around which the wire is bent. This arbor comprises a body portion the lower end $r'$ of which extends into a socket $R^2$ which is attached to the frame in the manner indicated in Figure 12. The wire is cut off and bent around the arbor R by two slides, a rear slide S and a front slide S'. The rear slide S comprises an upper portion $s$ having a downwardly extending portion $s'$ (Fig. 12) from which extends forwardly an arm $s^2$ which is pivotally connected at $s^3$ with a lever $s^4$ pivoted to the frame of the machine at $s^5$.

Figure 2:
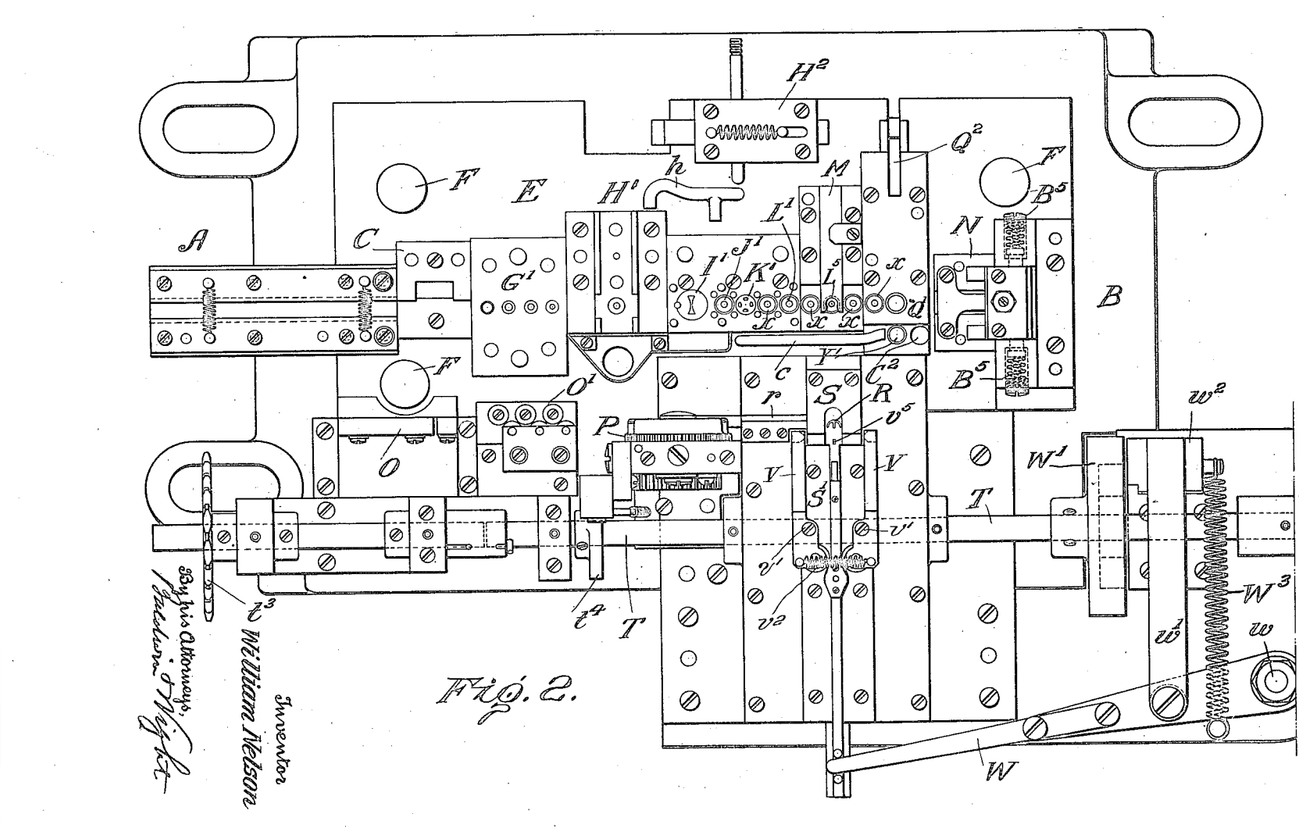
Figure 2 is a plan view of the lower part of the machine showing the general arrangement of the lower dies, the stock-feeding mechanism, the wire-feeding devices and the spring catch forming mechanism.
Figures 3, 4:
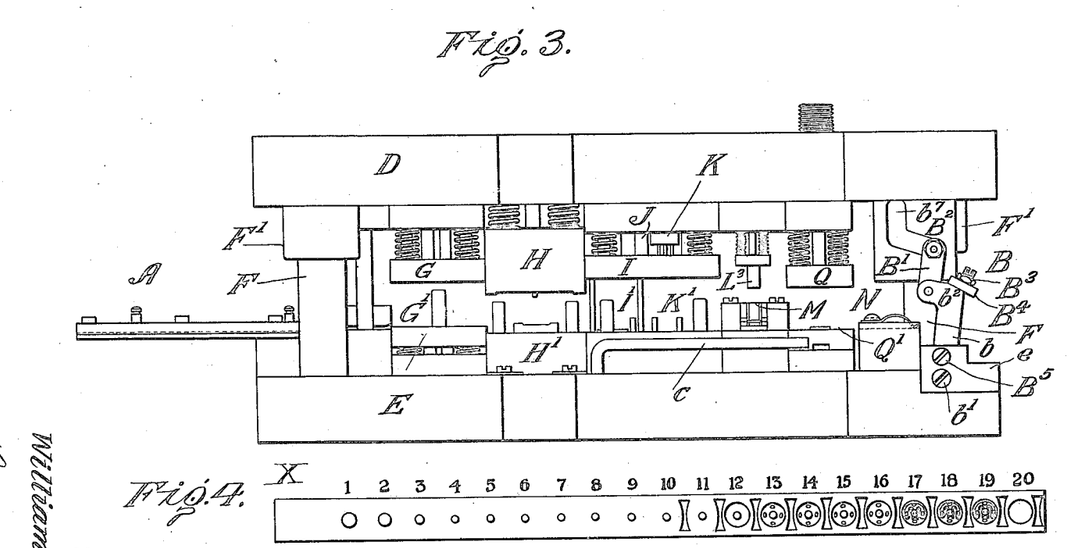
Figure 3 shows a front elevation of the upper and lower dies and the feed mechanism.
Figure 4 is a plan view of the stock showing the manner in which the dies operate thereon to produce the socket member of the fastener.
Figure 5:
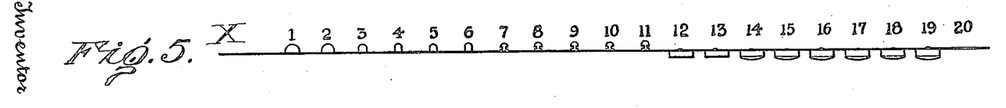
Figure 5 shows a vertical longitudinal section through the stock illustrated in Figure 4.
Figure 6:
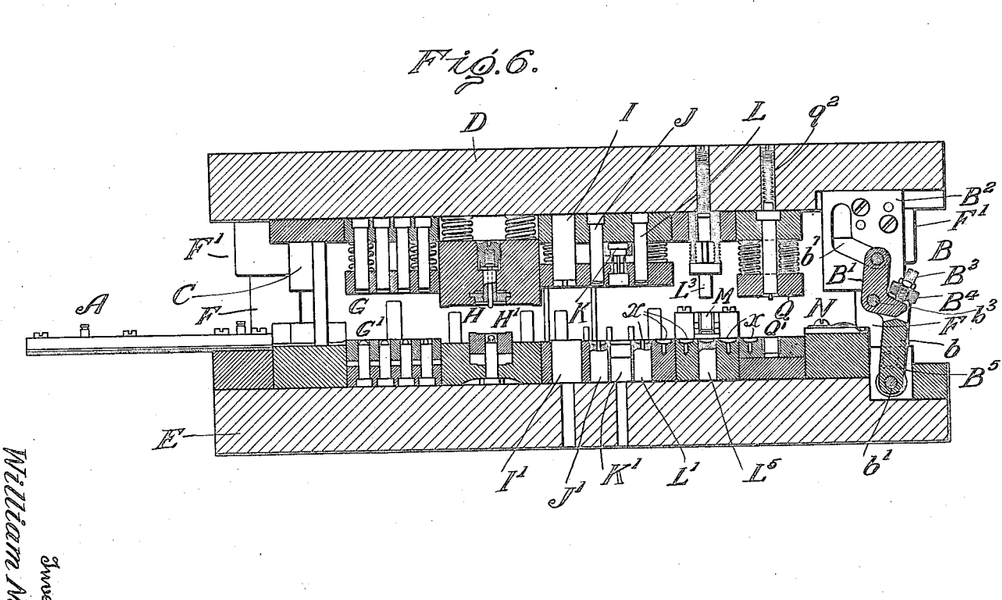
Figure 6 is a longitudinal section of the parts illustrated in Figure 3.
Figure 7:
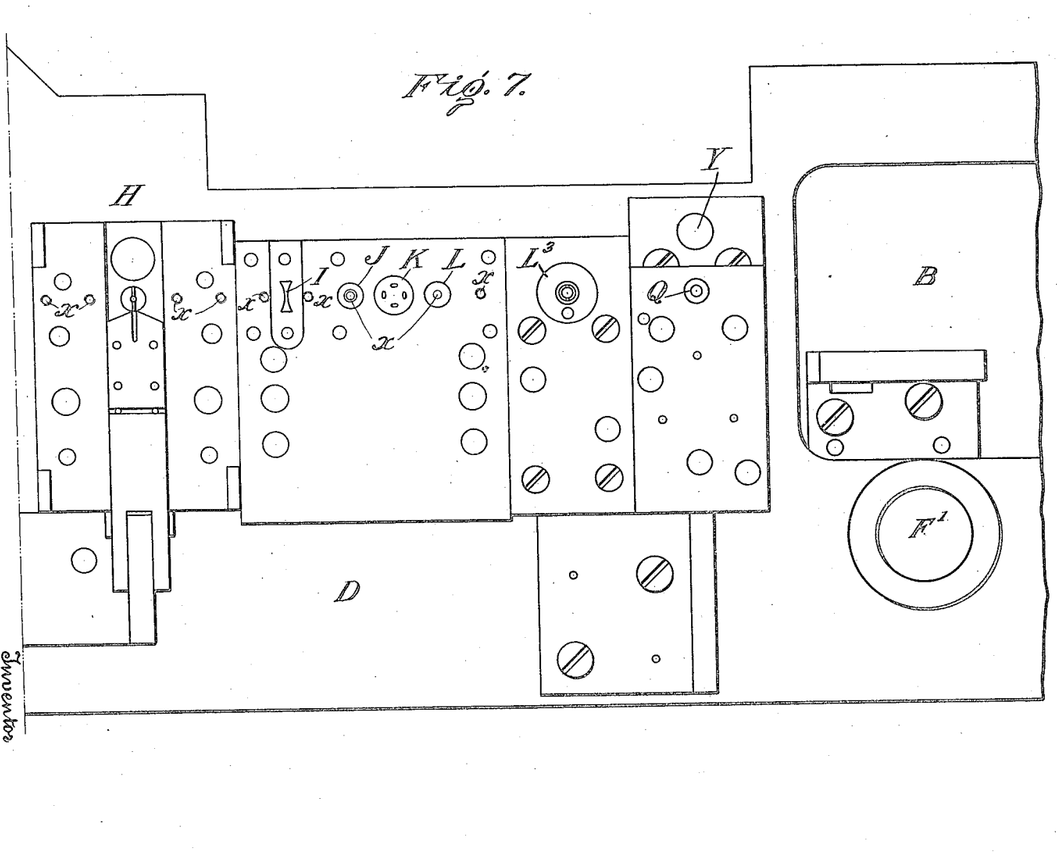
Figure 7 is an inverted plan view of some of the upper dies. It also shows part of the feed mechanism.
Figure 8:
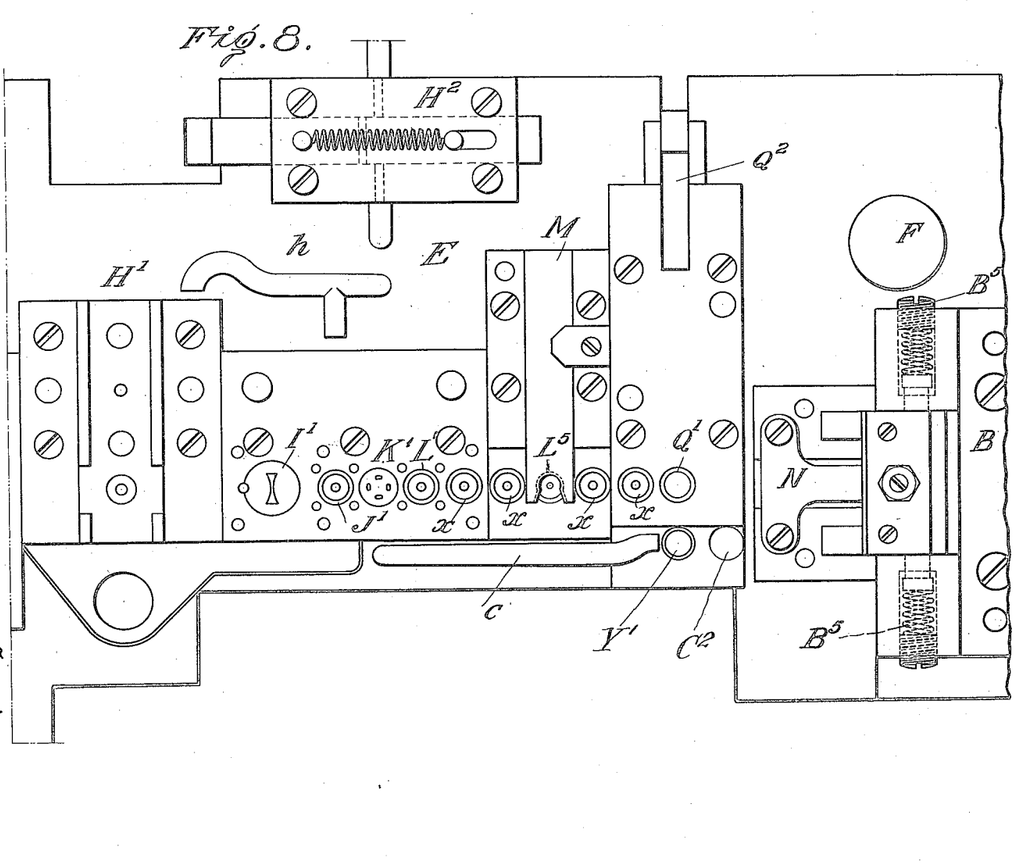
Figure 8 is a top plan view of the lower dies which cooperate with those shown in Figure 7. It likewise shows part of the feed mechanism.
Figure 9:
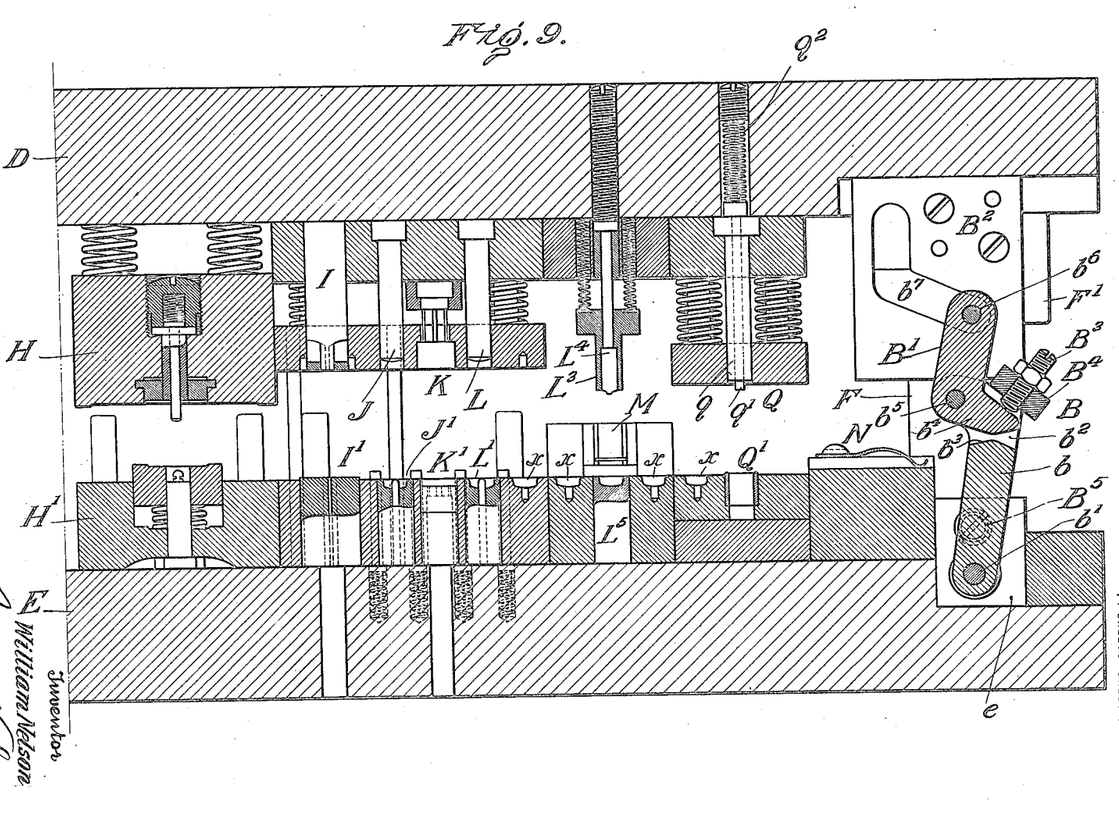
Figure 9 shows a vertical longitudinal section of the dies and mechanism shown in Figures 7 and 8.

The rear slide is actuated by a cam $t$ on the shaft T, which shaft, as shown in Fig. 2, extends to the left-hand end of the machine and is provided with a sprocket wheel $t^3$ connected by a chain $t'$ (Fig. 1) and a sprocket wheel $t^2$ to the shaft $Z^3$ of the actuating mechanism $Z^2$. A spring $t^5$ draws the rear slide in one direction while the cam $t$ moves it in the opposite direction.

Figure 11:
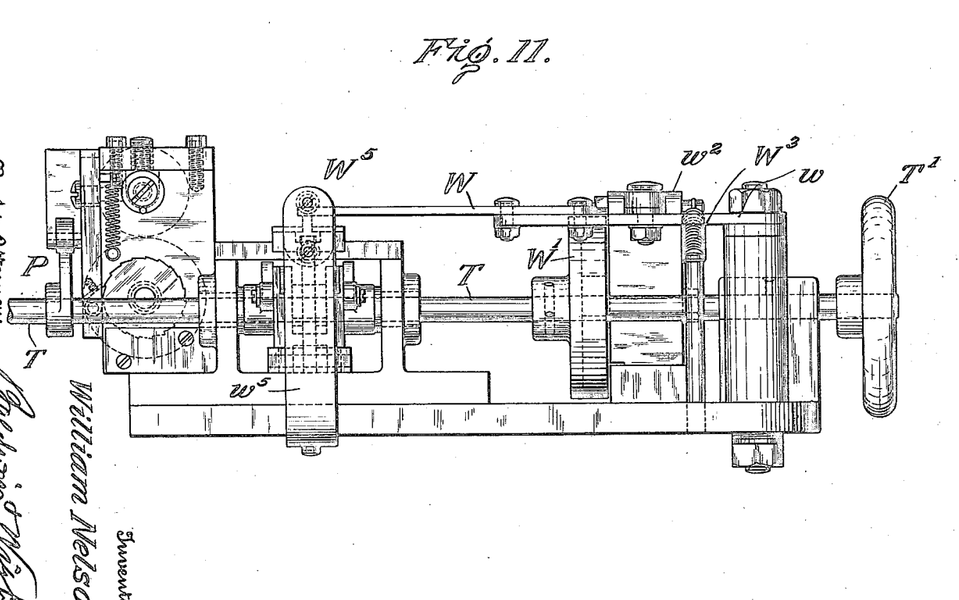
Figure 11 is a front elevation of the wire-feeding and bending devices.

The shaft T is provided with a cam $t^4$ which actuates the wire feeding mechanism, and said shaft T is provided with a hand wheel T' (Fig. 11) by which it may be turned or adjusted.

The front slide S' is adapted to slide in suitable guides and it is actuated by a lever $s^6$, pivoted at $s^7$ to the frame and also pivotally connected at $s^8$ with a link $s^9$ which is slotted as indicated at $s^{10}$ where it embraces the shaft T. The link $s^9$ carries a roller $s^{11}$ which is engaged at times by a cam $s^{12}$ on the shaft T. The arm $s^2$ carries pins $s^{13}$ which enter the slots $s^{14}$ in the frame of the machine and the construction is such that as the rear slide moves forwards it rises and as it moves rearwards it is depressed. The front slide is moved in one direction by the spring $s^{15}$ and in the opposite direction by the cam $s^{12}$.

The arm $s^2$ enters recesses in the sides of the arbor and as the rear slide is raised and lowered the arbor is correspondingly lifted and depressed.

Figures 16, 17, 18:
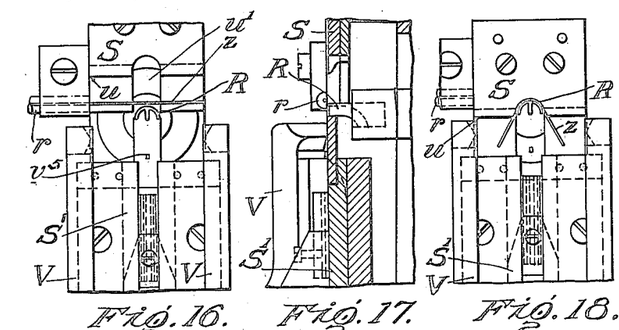
Figure 16 is a detail view showing the wire-bending mechanism in the position it assumes just before cutting off a length of wire for forming a spring.
Figure 17 is a sectional view of the mechanism in this position.
Figure 18 shows the condition of the mechanism immediately after cutting off a length of wire and giving the first bend thereto.
Figure 19:
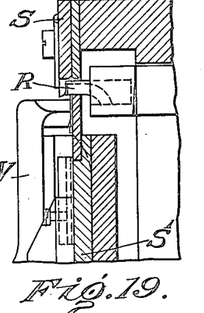
Figure 19 is a sectional view thereof.

The rear slide, as shown in Fig. 16, has a cutting edge at $u$ which cooperates with another cutting edge to sever the wire $z$ into suitable lengths to form spring catches. Said rear slide is also properly shaped at $u'$ (Fig. 16) to bend the wire around the arbor R to the form shown in Fig. 18.

Figures 20, 21, 22:
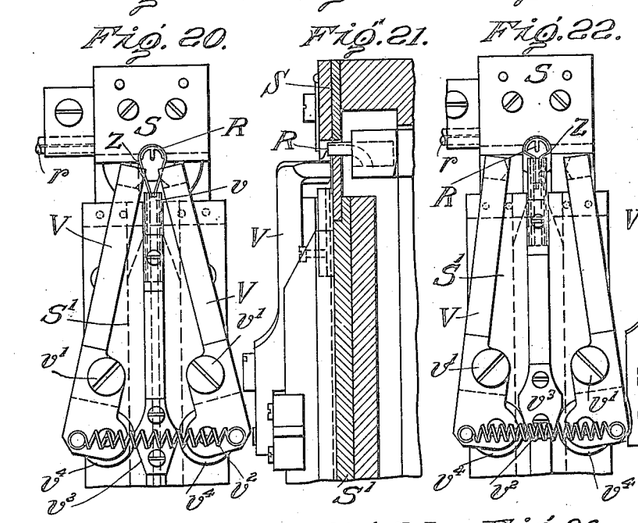
Figure 20 shows the wire-bending mechanism in the next position it assumes and where the wire is bent around the arbor or mandrel into pear shape.
Figure 21 is a sectional view of this mechanism.
Figure 22 shows the next step of the operation.
Figure 23:
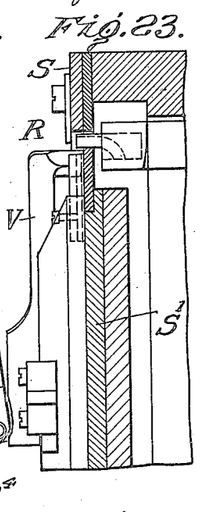
Figure 23 is a sectional view of the mechanism shown in Figure 22.

The front slide S' is formed with an end $v$ which is recessed and is adapted to engage the ends of the wire when they are in the condition shown in Fig. 20. Before the wire is bent to this condition, however, it is operated upon by horizontally arranged levers V which are pivoted at $v'$ to the frame of the machine and their working ends are normally drawn apart by a spring $v^2$. The front slide is provided with a cam $v^3$ so shaped as to engage rollers $v^4$ on the levers V and cause the working ends of these levers to approach each other in the manner indicated in Fig. 20 and to thus bend the wire from the shape shown in Fig. 18 to that shown in Fig. 20.

Figures 24, 25:
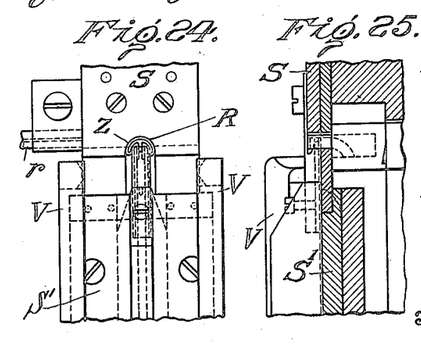
Figure 24 shows the mechanism in the condition it assumes when giving the final bend to the wire to form the spring.
Figure 25 is a sectional view of the mechanism when in this condition.
Figure 26:
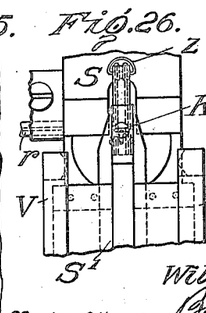
Figures 26 and 27 show the condition of the mechanism when transferring a completed spring from the arbor to the inserting mechanism.
Figure 27:
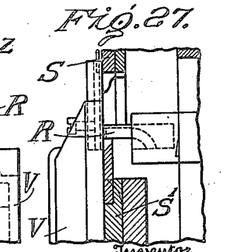

After the wire is thus bent the levers V open in the manner indicated in Fig. 22 and the recessed end $v$ of the front slide moves to the position shown in Fig. 22, and then to the position shown in Fig. 24, giving to the spring catch the proper shape.

When the wire is bent to the position shown in Fig. 20 its outer ends abut against a stop $v^5$ which prevents them from overlapping.

The front slide is connected with a lever W which is pivotally mounted at $w$ and is connected by a link $w'$ with a lever $w^2$ carrying a roller $w^3$ engaging a cam W' on the shaft T. The lever W is drawn in one direction by a spring $W^3$, but is operated in the other direction by the cam. It will be observed that the lever W is a long one and gives a long movement to the front slide. After the wire has been bent to proper shape, as indicated in Fig. 24, the front slide advances, the rear slide having been in the meantime withdrawn from the arbor and lowered, and the arbor having been also lowered. The front slide continues to move until it has inserted the spring catch in the spring holder or nest M before referred to.

It is observed that the nest M is open at one side to receive the formed spring held by the slide, and the mouth or open end of this nest is narrower than the breadth of the spring in its position in the slide. Therefore, when the slide moves so as to cause the spring held thereby to enter the nest, the said spring will snap into the groove in the nest. On withdrawal of the slide the spring is left in the nest.

After a spring has been inserted in the nest the upper die carrier descends and the spring-pressed plunger $d$ operates upon the nest to depress it. It will be observed by reference to Fig. 12 that the nest is pivotally mounted at $m$ and it is normally pressed upwards by a spring $m'$. The spring plunger $d$ causes the nest to be depressed upon the stock below the nest. The plungers $L^3$ and $L^4$ operate to remove the spring catch from the nest and insert it in a socket piece carried by the stock. The plungers $L^3$, $L^4$ cooperate with an anvil $L^5$ immediately below the nest.

Figure 15:
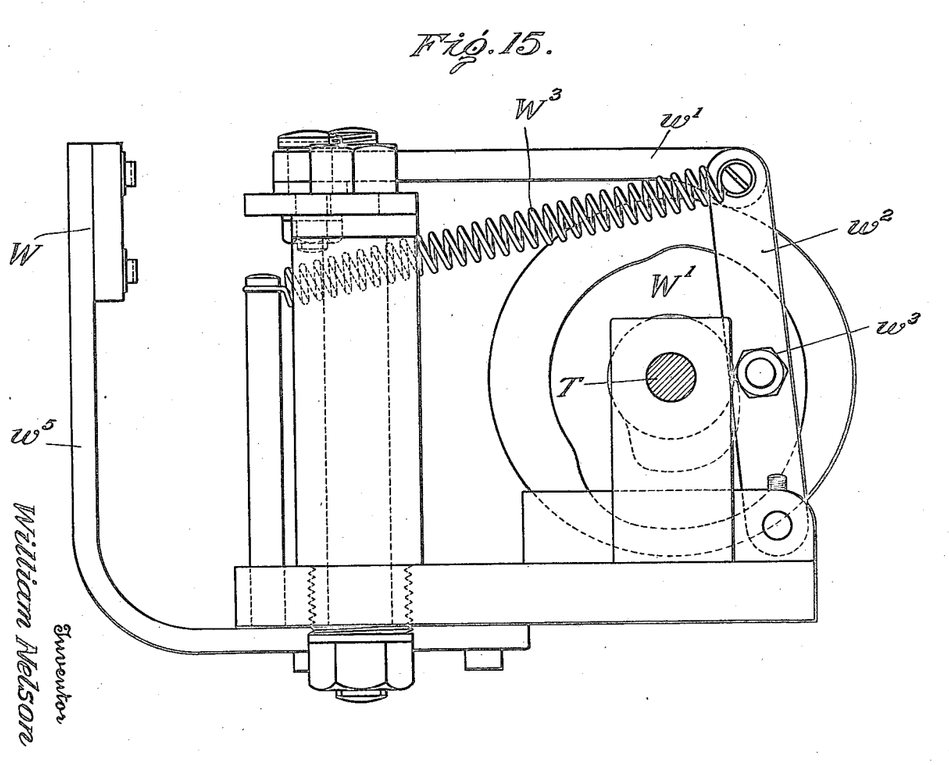
Figure 15 shows an end view of the spring transferring mechanism.

The operation of inserting the spring catches in the sockets is similar to that shown and described in the application of Huguley and Nelson before referred to. After a spring catch has been inserted the front slide is returned to its original position, its outward movement being limited by a buffer $W^5$, carried by a bracket $w^5$, most clearly indicated in Fig. 15.

Figures 10, 34:
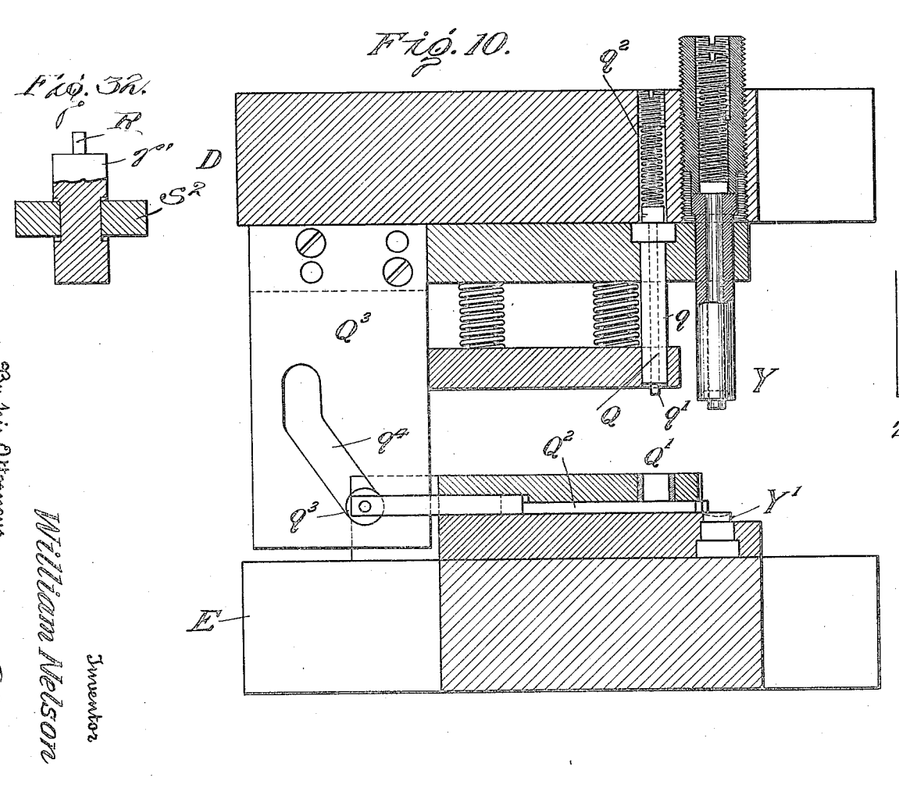
Figure 10 is a detail view in vertical section of the blanking out and curling dies.

As in the prior machine the spring catch is inserted in the socket before the edge of the body portion of the socket is curled or doubled. After the spring is inserted the spring carrying socket is blanked out from the stock by the dies Q, Q', most clearly shown in Fig. 10. The upper dies comprise a hollow plunger $q$, within which is a rod $q'$, while the lower die Q' is hollow as indicated. When the upper die carrier D descends the rod $q'$, which is spring pressed, as indicated at $q^2$, bears upon the central portion of the socket while the plunger $q$ descends and blanks out the socket from the stock and it also moves the socket blank to a lower level in front of a slide $Q^2$ which serves to move the socket laterally to a position between the finishing dies Y, Y'. The slide $Q^2$ is provided with a roller $q^3$ operating in a slot $q^4$ in a cam plate $Q^3$ attached to the upper die carrier D. At the proper time the slide is moved forward and transfers the socket to the anvil or lower die Y'. When the die carrier moves downwards the curling punches operate to turn or double the edge of the socket around the peripheral portion of the spring catch and thus secure it in place. The socket member of the fastener is then complete and may be delivered from the machine to a discharge opening $C^2$ in any suitable way, as by a blow pipe $c$.

Figures 28, 29, 30, 31:
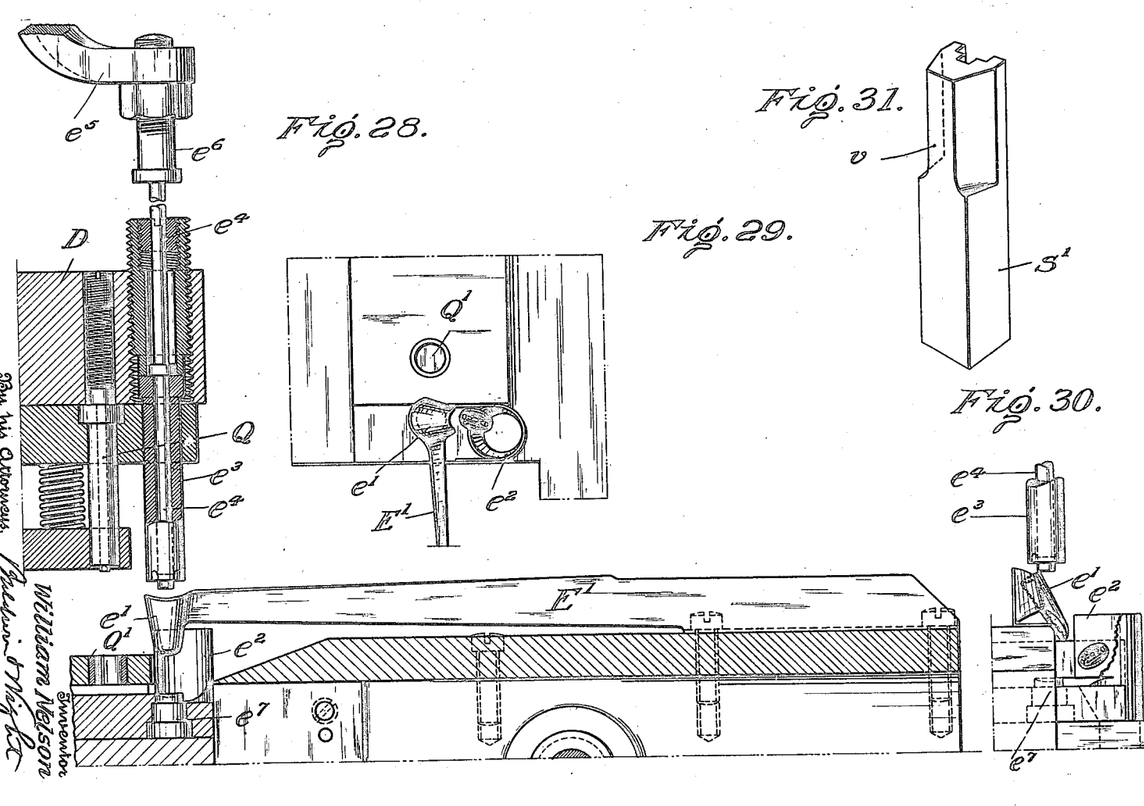
Figure 28 illustrates a modified way of transferring the completed socket member from the finishing dies to a suitable receptacle.
Figures 29 and 30 are detail views of the same mechanism.
Figure 31 is a perspective view of the front slide.
Figure 33:
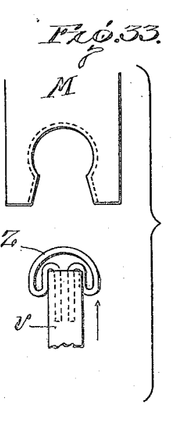
Fig. 33 is a detail view showing the manner in which the formed springs are delivered to and held in the spring nest.

In Figures 28, 29 and 30 I have shown other mechanism for delivering the completed socket member from the curling dies. In this case a curved receiver $e'$ is carried by a flexible metal bar E' attached to the frame of the machine and receives and transfers the completed spring-containing socket member to a receptacle $e^2$ from which it may pass to any desired container.

The dies for curling the edge of the socket member are in this case somewhat modified. The part $e^3$ is rigidly attached to the die carrier while the rod $e^4$ is not spring pressed as before and it extends upwards toward a bracket $e^5$ carrying an adjustable screw $e^6$ to regulate the movement of the rod $e^4$. After the button or socket member has its edge curled over upon the spring it is squeezed into the punch or guide $e^3$ which lifts the button and after the punch has been raised a certain distance which is regulated by the screw $e^6$ the rod $e^4$ is stopped by the screw $e^6$ and the button is ejected out of the curling punch and it drops onto the receiver $e'$ and then enters the receptacle $e^2$. The receiver $e'$ is located immediately below the punches $e^3$, $e^4$, and above the anvil $e^7$ but when the punches move downwards the receiver is moved sidewise out of their way but assumes a position between the upper and lower punches to receive the button or socket member when the latter is dropped.

Some of the details of construction shown in the drawings have not been described because they are similar to those fully shown and described in the application of Huguley and Nelson before mentioned and some features which are shown in detail have likewise not been described as being of no special importance. I would say however that the chips or pieces of metal formed by the slotting dies H, H' and the piercing dies J, J' may be blown away by compressed air from the pipes $h$, the admission of air to said pipes being controlled by suitable mechanism $H^2$.

As will be evident from a comparison of the mechanism herein shown and described the devices for forming the button or socket member from the stock, for inserting the springs in said socket members, and for blanking them out from the stock are similar to those shown in the before mentioned application of Huguley and Nelson. It is also evident that the devices for straightening the wire and for feeding it to the wire bending mechanism is similar to that before referred to, but the mechanism for bending the wire into spring form and for transferring the springs from the spring forming arbor to the spring holder, forming part of the spring inserting mechanism, is different, being much simpler and more efficient.

I claim as my invention:

1. In a machine for forming the socket members of snap fasteners, the combination with means for forming the socket members, of a spring forming mechanism comprising means for feeding a length of wire step by step, and devices for bending the wire into spring form comprising an arbor, front and rear slides for cutting the wire to proper length and for giving the initial and final bends thereto, pivoted levers operating to give the intermediate bends to the wire, and means actuated by one of the slides for operating said levers.

2. In a machine for forming the socket members of snap fasteners, the combination with means for forming the socket members, of a spring forming mechanism comprising means for feeding a length of wire step by step, devices for bending the wire into spring shape comprising front and rear slides, pivoted levers operated by one of said slides, an arbor about which the spring is bent, means for raising and lowering the arbor, and means for giving to one of the slides a movement sufficient to move a formed spring into position for insertion in a socket member.

3. In a machine for forming the socket members of snap fasteners, the combination with means for forming the socket members, a spring holder for supporting the spring before it is inserted in a socket member, spring forming mechanism comprising means for feeding a length of wire step by step, front and rear slides and levers for bending the wire, means for operating these slides, and means for giving an additional movement to one of said slides for moving a formed spring from the arbor to the beforementioned spring holder.

4. Mechanism for bending a piece of wire into spring form comprising an arbor, a slide provided with means for reciprocating it and for moving it up and down, connections between said slide and the arbor by which the arbor is raised and lowered with the slide, another slide cooperating with that first mentioned and with the arbor for bending the wire, means for reciprocating said slide, and levers operated by the movement of said last-mentioned slide for giving bends to the wire.

5. The combination with means for forming the socket members of snap fasteners, of a yieldingly supported spring holder which receives the springs before they are inserted in the socket members, a yielding rod for depressing the spring holder, spring forming mechanism comprising an arbor, front and rear slides, and laterally moving levers which are operated by one of said slides, means for raising and lowering the arbor and one of said slides, and devices for giving to the other slide additional movement sufficient to move a formed spring from the arbor to said spring holder.

6. Spring forming mechanism comprising a vertically moving arbor, a slide provided with means for reciprocating it and for moving it vertically, connections between the arbor and the slide whereby they are moved vertically together, another slide cooperating with that first mentioned, mechanism for reciprocating this slide, pivoted levers cooperating with the slides to bend the wire to spring form, a cam carried by one of said slides for operating said levers, a spring holder, and means for operating one of the slides to move a spring from the arbor to said spring holder.

7. The combination with the finishing dies comprising a hollow punch and an independently movable rod, of an anvil cooperating with the punch and rod, a laterally moving receiver for the completed button which moves laterally when the punch and rod descend but which moves to a position between the anvil and the punches to receive the completed button when the latter is ejected.

8. In connection with the subject matter of claim 7 a receiver having an inclined portion for directing the completed button from the forming mechanism to a suitable receiver.

9. In combination with the punch and anvil for forming the button, a curved receiver for the completed button mounted on a flexible metal bar attached to the machine frame.

10. In a machine of the class described, a spring forming mechanism including a slide having a recess in one end to receive the ends of the spring when the latter is contracted, a vertically movable arbor about which the spring is bent, arms for shaping the spring ends around the arbor and for holding the said ends in the path of the said slide, and means for withdrawing the arbor from said spring after the latter is engaged with the said slide.

11. In a machine of the class described, a pair of slides movable toward and away from each other, an arbor arranged between said slides and around which a spring wire is forced by one of said slides, said wire forcing slide moving downwardly and out of the path of the other slide when moving in the same direction with the latter, a connection between said wire forcing slide and said arbor whereby the latter is raised and depressed by movement of the former, the other of said slides adapted to engage and retain a spring formed on said arbor, and means for moving said spring retaining slide over and past the said arbor and the wire forcing slide.

12. In a machine of the character described, a spring forming mechanism including a slide having a recess in one end to receive the ends of a spring and to hold the latter, an open sided nest in alinement with said slide and adapted to receive a spring from the said slide, and the said nest at its open side being narrower than the breadth of the said spring.

13. In a machine for forming the socket members of snap fasteners, the combination with means for shaping the socket members, of a spring-forming mechanism comprising an arbor about which springs are formed, slides on opposite sides of the arbor for shaping wire about the arbor, members at opposite sides of the arbor movable laterally to shape the wire about the arbor, means for moving the arbor and one of the slides to carry them out of the path of movement of the other slide and means for moving that other slide to carry a spring which has been formed about the arbor from the arbor to a position for assembling the spring in a socket member.

In testimony whereof, I have hereunto subscribed my name.

WILLIAM NELSON.

Witnesses:
JULIUS GOLDMAN,
EUGENE L. ROGER.